(12) United States Patent
Tamai et al.

(10) Patent No.: US 7,116,009 B2
(45) Date of Patent: Oct. 3, 2006

(54) POWER DISTRIBUTION APPARATUS FOR DISTRIBUTING POWER TO VARIOUS ELECTRICAL LOADS

(75) Inventors: Yasuhiro Tamai, Shizuoka-ken (JP); Tetsuya Hasegawa, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 492 days.

(21) Appl. No.: 10/212,244

(22) Filed: Aug. 6, 2002

(65) Prior Publication Data

US 2003/0030324 A1   Feb. 13, 2003

(30) Foreign Application Priority Data

Aug. 7, 2001   (JP) .......................... P 2001-239643

(51) Int. Cl.
*H02H 7/18* (2006.01)
*G05F 1/10* (2006.01)

(52) U.S. Cl. .................. 307/10.7; 307/82; 323/266

(58) Field of Classification Search ............. 307/10.7, 307/82; 323/266
See application file for complete search history.

(56) References Cited

U.S. PATENT DOCUMENTS

| 5,757,624 | A |   | 5/1998 | Kawaguchi |
| 5,834,854 | A | * | 11/1998 | Williams ................. 307/10.6 |
| 6,166,934 | A |   | 12/2000 | Kajouke et al. |
| 6,340,848 | B1 |   | 1/2002 | Maeda |
| 6,400,589 | B1 | * | 6/2002 | Abo et al. ................ 363/65 |
| 6,762,595 | B1 | * | 7/2004 | Tamai et al. ............. 323/266 |
| 6,806,588 | B1 | * | 10/2004 | Amano et al. ............ 307/10.7 |

FOREIGN PATENT DOCUMENTS

JP   10-84626   3/1998

OTHER PUBLICATIONS

Search Report issued in the EP counterpart application.

* cited by examiner

*Primary Examiner*—Brian Sircus
*Assistant Examiner*—Brett Squires
(74) *Attorney, Agent, or Firm*—Finnegan, Henderson, Farabow, Garrett & Dunner, L.L.P.

(57) ABSTRACT

A power distributing apparatus is provided to reduce the number of voltage converters. The power distributing apparatus 1 includes a power source part 4 for supplying a power of 42V, an electrical connection box 7 connected with the part 4 through a power line 5, and a plurality of electronic control units 8a, 8b . . . , 8n. The electrical connection box 7 has a regular-supply converter 9 to convert a high voltage of 42V to an intermediate voltage higher than a load voltage of 5V. The regular-supply converter 9 can exhibit a high conversion efficiency when the apparatus is operated under high load. Each of the electronic control units 8a, 8b . . . , 8n has a series regulator 14 to convert the intermediate voltage to the load voltage. Owing to the supply of voltage higher than the load voltage by the regular-supply converter 9, there is no need to consider inconvenience due to voltage drop between the converter and a remote load.

5 Claims, 4 Drawing Sheets

POWER DISTRIBUTION APPARATUS FOR DISTRIBUTING POWER TO VARIOUS ELECTRICAL LOADS

BACKGROUND OF THE INVENTION

1. Field of the Invention

The present invention relates to a power distribution apparatus mounted on a vehicle (or the like) to distribute an electrical power to a variety of electrical loads in the vehicle.

2. Description of Related Art

In the conventional vehicle adopting a power source part of 14V (voltage), the power distribution apparatus includes an electrical connection box to which high-voltage power is supplied from the power source part, and a plurality of electronic control units connected to the electrical connection box through power lines, the electronic control units each having a built-in series regulator to which the high-voltage power is distributed. In operation, the high-voltage power from the electrical connection box is converted into a low-voltage power by the series regulators in the electronic control units. Then, the so-converted, low-voltage is supplied to a plurality of electrical loads connected to respective electronic control units.

Meanwhile, recently, there has been developed a "high-voltage" vehicle using a voltage of 42V, which is loaded with a motor generator effective to reduce fuel consumption. However, if the above-mentioned power distribution apparatus is applied to such a high-voltage vehicle, then the power distribution apparatus exhibits a remarkably-deteriorated conversion efficiency and also a great heat generation. That is, if the vehicle adopts a power source of 14V and further a voltage for each load is equal to 5V, then the series regulators each has an efficiency of 35.7% $[=(14-5)/14]$. While, if the vehicle adopts a power source of 42V and further a voltage for each load is equal to 5V, the series regulator will have an efficiency of 11.9% $[=(42-5)/42]$.

Although there might be supposed a method of adopting a switching regulator in place of the series regulator, it is impossible to prevent a battery from going flat because the switching regulator has a deteriorated conversion efficiency when the apparatus is operated under light load. In order to solve this problem, there has been proposed a system where all electronic control units that require stand-by currents (e.g. keyless unit) are respectively equipped with stand-by current suppliers. In this system, when an ignition switch is turned on, the power supply is accomplished by the switching regulators. On the other hand, when the ignition switch is turned off, the power supply is accomplished by the stand-by current suppliers. However, since this system requires expensive switching regulators for the respective electronic control units and also requires stand-by current suppliers for all of the electronic control units that require stand-by currents, the manufacturing cost for the same system is elevated excessively.

In connection, Japanese Patent Application Laid-open No. 10-84626 discloses another conventional power distributing apparatus where the electrical connection box is supplied with high-voltage power from the power source and also provided with a voltage converter which converts a high voltage into a low voltage (5V), so that the resultant low-voltage power is supplied to respective electronic control units. Owing to the provision of a single voltage converter, it is possible to construct the power distributing apparatus at low cost.

In this power distributing apparatus, however, there arises a problem of voltage drop in case of the power supply against electrical loads far from the voltage converter. In order to prevent such a faraway power supply, it is necessary to increase the number of voltage converters, causing the manufacturing cost to be elevated.

In addition, the voltage converter is required to meet requirements of the most severe electrical load in terms of converted voltage and temperature characteristics, causing the production cost of the apparatus to be elevated. Since the converter is apt to output with power fluctuations due to gain and loss in load currents, it is difficult to supply the plurality of loads with accurate powers.

SUMMARY OF THE INVENTION

Under the circumstances, it is therefore an object of the present invention to provide a power distributing apparatus by which it is possible to reduce the number of voltage converters to the utmost and which employs low-priced series regulators against which severe output accuracy is not required, whereby the apparatus can be constructed at low price. Further, it is an object of the present invention to provide a power distributing apparatus which has an improved efficiency to convert a voltage of a power source and which is not accompanied with great heat-generation, allowing fuel consumption of vehicle to be reduced.

The object of the present invention described above can be accomplished by a power distributing apparatus comprising:

a power source part for supplying power of a high voltage;

an upstream-side power distributing part connected with the power source part through a power line thereby to accept power supply of the high voltage from the power source part;

a plurality of downstream-side power distributing parts connected with the upstream-side power distributing part through power lines thereby to accept power supply from the upstream-side power distributing part and supply power of a load voltage to a plurality of loads;

a regular-supply converter disposed in the upstream-side power distributing part and also connected to all of the downstream-side power distributing parts to convert the high voltage to an intermediate voltage lower than the high voltage and higher than the load voltage, the regular-supply converter capable of converting a voltage with a high conversion efficiency when the power distributing apparatus is operated under high load;

a stand-by current supply converter disposed in the upstream-side power distributing part and also connected to only one or more downstream-side power distributing parts for supplying a stand-by current to convert the high voltage to the intermediate voltage, the stand-by current supply converter capable of converting a voltage with a high conversion efficiency when the power distributing apparatus is operated under light load; and a plurality of series regulators respectively disposed in the downstream-side power distributing parts to convert the intermediate voltage to the load voltage.

In the above power distributing apparatus, since the regular-supply converter supplies the downstream-side power distributing parts with the power of a voltage higher than the load voltage, there is no need to consider inconvenience due to voltage drop. Therefore, it is possible to minimize the number of regular-supply converters and to supply the stand-by current in a lump by the stand-by current supply converter having a high conversion efficiency when the apparatus is operated under light load.

Further, since the series regulators supply accurate load voltage to the respective loads, the regular-supply converter is not required to have severe output accuracy. Since the downstream-side power distributing parts are respectively provided with the series regulators, they each have only to be equipped with temperature characteristics and accuracy required for a load in charge of the corresponding downstream-side power distributing part. Additionally, the regular-supply converter in the upstream-side power distributing part is constructed to have an improved conversion efficiency. In operation, the respective series regulators convert the intermediate voltage as a result of conversion by the regular-supply converter, into the load voltage.

As the second aspect of the invention, the power distributing apparatus of the second aspect further comprises a current sensor for detecting a current flowing from the upstream-side power distributing part to the downstream-side power distributing parts and a controller for controlling the operations of the regular-supply converter and the stand-by current supply converter. Under condition that the power distributing apparatus is mounted on a vehicle having an ignition switch, the controller operates so as to activate the regular-supply converter thereby to carry out power supply to the downstream-side power distributing parts when the ignition switch is turned on; activate the regular-supply converter hereby to carry out the power supply when the ignition switch is turned off and a current value detected by the current sensor is more than a predetermined value; and activate the stand-by converter thereby to carry out the power supply when the ignition switch is turned off and a current value detected by the current sensor is less than the predetermined value.

According to the second aspect of the invention, when the ignition switch is turned off, it is executed to switch the operations of the regular-supply converter and the stand-by current supply converter on a basis of a current value detected by the current sensor. Thus, it is possible to control the operation of the converters on a basis of actual current values.

As the third aspect of the invention, the intermediate voltage is somewhat higher than the load voltage.

According to the third aspect of the invention, the power distributing apparatus converts the power of high voltage to a voltage close to the load voltage by the regular-supply converter capable of converting a voltage with a high conversion efficiency when the apparatus is operated under high load.

As the fourth aspect of the invention, the downstream-side power distributing parts are electronic control units.

As the fifth aspect of the invention, the intermediate voltage is a voltage of power for driving the electronic control units.

According to the fourth and fifth aspects of the invention, it is possible to divert the general-use electronic control units as the downstream-side power distributing apparatus.

These and other objects and features of the present invention will become more fully apparent from the following description and appended claims taken in conjunction with the accompany drawings.

DESCRIPTION OF THE PREFERRED EMBODIMENT

Embodiments of the present invention will be described with reference to the drawings.

Figure 1:
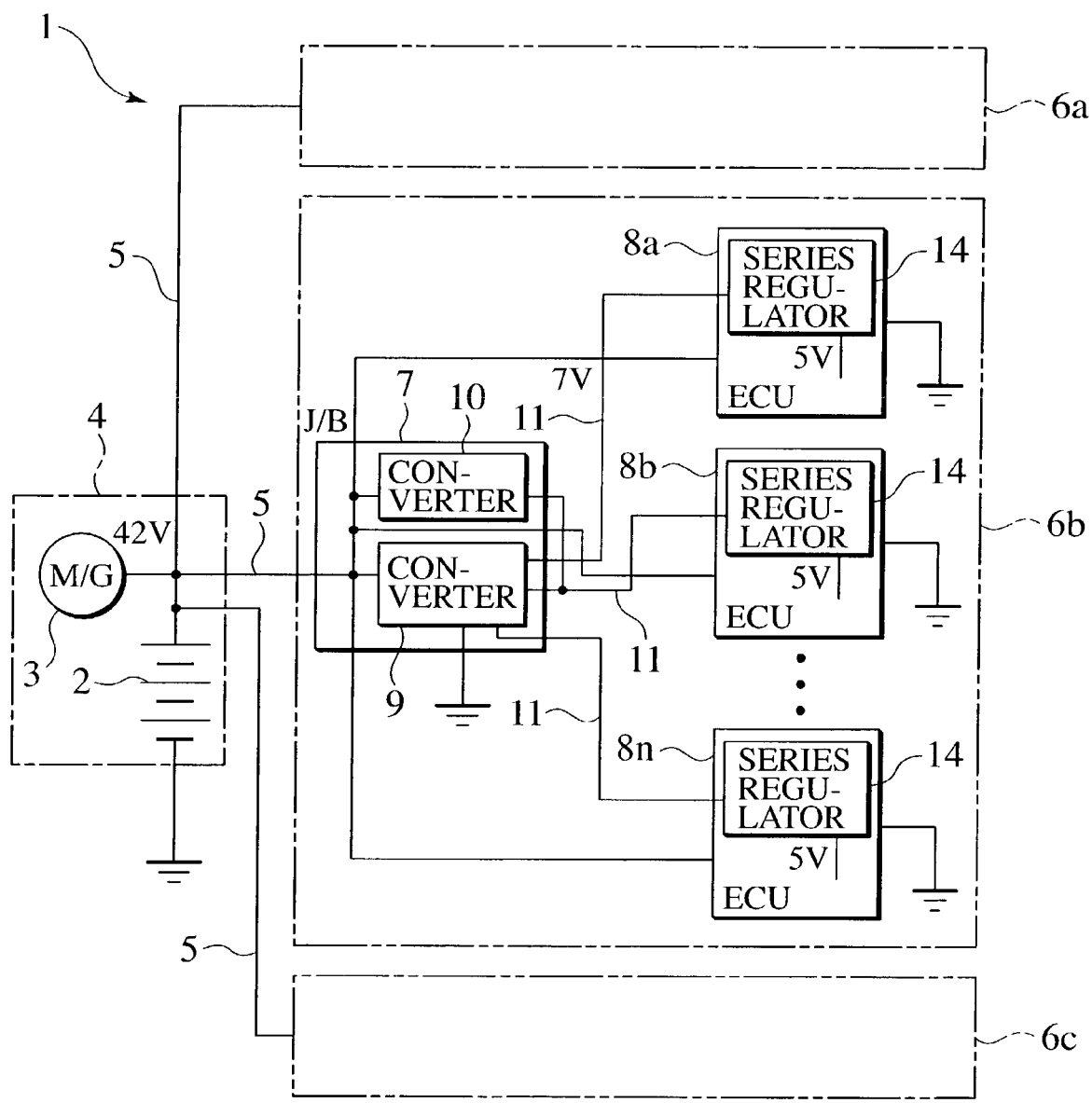
FIG. 1 is a circuit block diagram of a power distributing apparatus in accordance with the first embodiment of the present invention.
Figure 2:
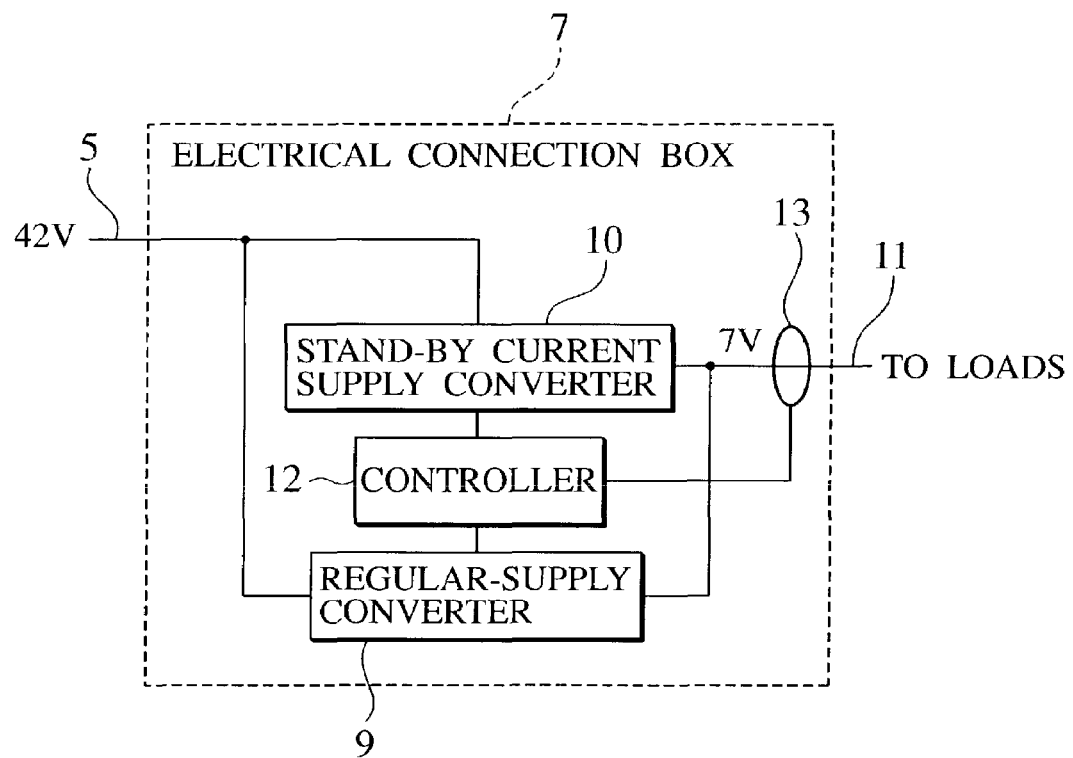
FIG. 2 is a detailed circuit diagram of a part inside an electrical connecting box, which is related to the power distributing apparatus, showing the first embodiment of the invention.
Figure 3:
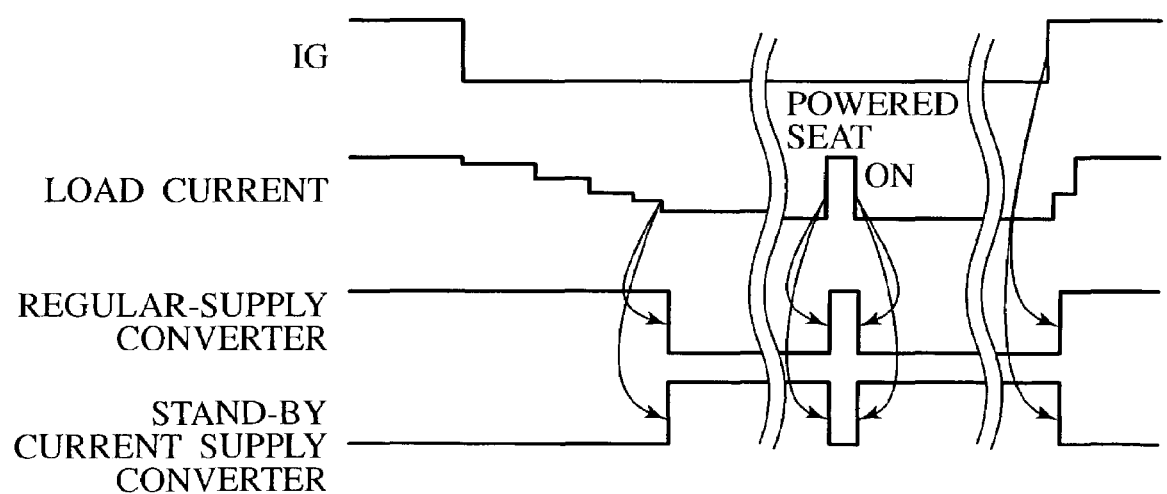
FIG. 3 is a wave diagram of respective outputs for explanation of switching respective outputs of a regular-supply converter and a stand-by current supply converter, showing the first embodiment of the invention.
Figure 4:
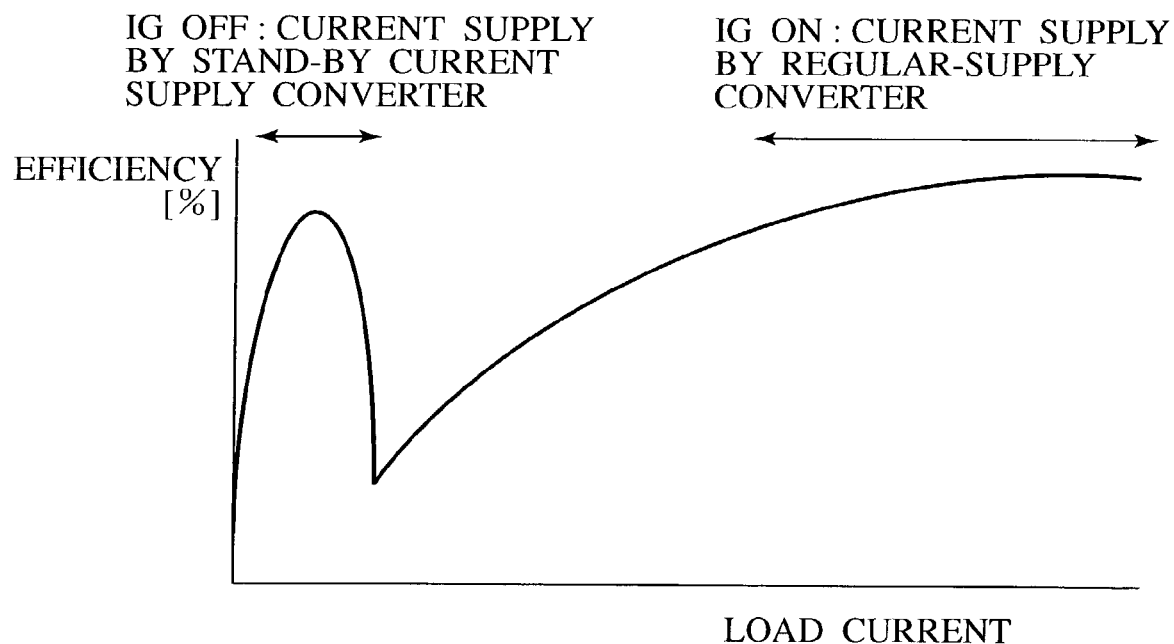
FIG. 4 is a characteristic diagram of conversion efficiency against load current, showing the first embodiment of the invention.

FIGS. 1 to 4 show the first embodiment of the present invention. In the first embodiment, there is presented an example where a power distributing apparatus 1 of the invention is mounted on a so-called "high-voltage" vehicle powered by 42V. In these figures, FIG. 1 is a circuit block diagram of the power distributing apparatus 1, while FIG. 2 is a detailed circuit block diagram of a part inside an electrical connection box 7, which is related to the power distributing apparatus 1. FIG. 3 is a wave diagram of respective outputs for explanation of switching respective outputs of a regular-supply converter 9 and a stand-by current supply converter 10. FIG. 4 is a characteristic diagram of conversion efficiency against load current.

The regular-supply converter 9 is formed by a DC(direct current)/DC converter that can exhibit a high conversion efficiency when the apparatus 1 is driven under high load. The converter 9 converts a high-voltage of 42V into an intermediate-voltage power of 7V which is somewhat higher than a load voltage (5V). The output of the regular-supply converter 9 is supplied to all of the electronic control units 8a, 8b . . . , 8n in the blocks 6a, 6b, 6c through power lines 11. The stand-by current supply converter 10 is formed by a DC(direct current)/DC converter that can exhibit a high conversion efficiency when the apparatus 1 is driven under light load. The converter 10 converts a high-voltage of 42V into an intermediate-voltage power of 7V which is somewhat higher than a load voltage (5V), too. The output of the stand-by current supply converter 10 is supplied to an electronic control unit which takes charge of an electrical load (not shown) requiring a power even when an ignition switch (not shown) of the vehicle is turned off. For example, the output of the stand-by current supply converter 10 is supplied to only the electronic control unit 8b for supplying a stand-by current, through the power line 11.

The regular-supply converter 9 is formed by a DC(direct current)/DC converter that can exhibit a high conversion efficiency when the apparatus 1 is driven under high load. The converter 9 converts a high-voltage of 42V into an intermediate-voltage power of 7V which is somewhat higher than a load voltage (5V). The output of the regular-supply converter 9 is supplied to all of the electronic control units 8a, 8b . . . , 8n in the blocks 6a, 6b, 6c through power lines 11. The stand-by current supply converter 10 is formed by a DC(direct current)/DC converter that can exhibit a high conversion efficiency when the apparatus 1 is driven under light load. The converter 10 converts a high-voltage of 42V into an intermediate-voltage power of 7V which is somewhat higher than a load voltage (5V), too. The output of the stand-by current supply converter 10 is supplied to an electronic control unit which takes charge of an electrical load (not shown) requiring a power even when an ignition switch (not shown) of the vehicle is turned off. For example, the output of the stand-by current supply converter 10 is supplied to only the electronic control unit 8a for supplying a stand-by current, through the power line 11.

The converter 10 converts a high-voltage of 42V into an intermediate-voltage power of 7V which is somewhat higher than a load voltage (5V), too. The output of the stand-by current supply converter 9 is supplied to an electronic control unit which takes charge of an electrical load (not shown) requiring a power even when an ignition switch (not shown) of the vehicle is turned off. For example, the output of the stand-by current supply converter 9 is supplied to the electronic control unit 8a for supplying a stand-by current, through the power line 11.

As shown in FIG. 2, the electrical connection box 7 contains a controller 12 by which the operations of the regular-supply converter 9 and the stand-by current supply converter 10 are controlled respectively. The controller 12 does control the converters 9, 10 on the ground of both ON/OFF state of the ignition switch and outputs from a current sensor 13. The details of contents controlled by the controller 12 will be described later. The current sensor 13 detects a current of the power line 11 provided for both of the regular-supply converter 9 and the stand-by current supply converter 10.

Back to FIG. 1 again, a plurality of electrical loads (not shown) are connected with the electronic control units 8a . . . , 8n for controlling the above loads. The electronic control units 8a, 8b, . . . 8n have built-in series regulators 14 respectively, to which the intermediate voltage of 7V of the electrical connection box 7 is led. Each of the series regulators 14 is formed with a known structure that stabilizes an output voltage by feedback of the changes of load voltage by means of e.g. operational amplifier, converting the intermediate voltage of 7V into the load voltage of 5V. The output from each series regulator 14 is supplied to a plurality of electrical loads in charge of the corresponding regulator 14.

Referring to FIG. 3, the operation of the above-mentioned power distributing apparatus 1 will be described as follows. When the ignition switch is turned on, the regular-supply converter 9 is driven to convert a high voltage of 42V to an intermediate voltage of 7V. The converted intermediate voltage 7V is supplied to the electronic control units 8a . . . , 8n and then, the series regulators 14 in the units 8a . . . , 8n convert the intermediate voltage of 7V to the load voltage of 5V for the respective electrical loads.

When the ignition switch is changed from its ON state to the OFF state, the load current is reduced gradually. When the load current becomes less than a threshold value (a predetermined value), the operation of the regular-supply converter 9 is stopped and simultaneously, the drive of the stand-by current supply converter 10 is started. Consequently, the power supply for the electronic control units 8a, 8b, . . . 8n is altered from the regular-supply converter 9 to the stand-by current supply converter 10.

Under condition that the ignition switch is turned off, if a load current becomes more than the threshold value due to the drive of an electric load (e.g. drive of powered seat device), the operation of the stand-by current supply converter 10 is stopped and simultaneously, the drive of the regular-supply converter 9 is started. That is, the power supply for the electronic control unit 8b is altered from the regular-supply converter 9 to the stand-by current supply converter 10. Then, when the so-elevated load current falls less than the threshold value, the operation of the regular-supply converter 9 is stopped, while the drive of the stand-by current supply converter 10 is started again.

When the ignition switch is changed from the OFF state to the ON state, the drive of the stand-by current supply converter 10 is stopped irrespective of values of current detected by the current sensor 13, while the drive of the regular-supply converter 9 is started. That is, the power supply for the electronic control units 8a, . . . , 8n is altered from the stand-by current supply converter 10 to the regular-supply converter 9.

According to the power distributing apparatus 1, since the regular-supply converter 9 supplies the electronic control units 8a, 8b, . . . 8n with a voltage (7V) higher than the load voltage (5V), there is no need to consider inconvenience of voltage drop between the unit(s) 8a, 8b, . . . 8n and a remote electrical load(s). Therefore, it is possible to provide the apparatus 1 with the smallest number of converters 9. Further, in the electrical connection box 7, the regular-supply converter 9 is not required to have a severe output accuracy since the series regulators 14 supply accurate load voltage to the respective electrical loads. Thus, it is possible to miniaturize a ripple-absorption condenser etc. Since the electronic control units 8a, . . . , 8n are respectively provided with the series regulators 14, they each have only to be equipped with temperature characteristics and accuracy required for the load in charge of the corresponding electronic control unit. In addition to the above-mentioned reasons, by using no expensive switching regulator but the series regulator, it is possible to construct the power distributing apparatus 1 at low cost. Additionally, according to the invention, the regular-supply converter 9 in the electrical connection box 7 is formed with structure of high conversion efficiency and the respective series regulators 14 convert the intermediate voltage, which has been obtained by the regular-supply converter 9, into the load voltage. Thus, as shown in FIG. 4, it is possible to reduce a loss in the voltage conversion efficiency and also heat generation, so that the fuel consumption of the vehicle can be improved.

Further, since the accurate load voltage produced by the series regulators 14 is supplied to the respective loads, there is no need to shield the power lines 11 extending from the regular-supply converter 9 to the series regulator 14.

According to the first embodiment of the invention, the electrical connection box 7 is provided with the stand-by current supply converter 10 which has a high conversion efficiency at light load and converts the power of high voltage of the power source part 4 into the intermediate voltage and further, both of the stand-by current supply converter 10 and the regular-supply converter 9 supply an electrical power to the electronic control unit 8b performing the power supply of stand-by current. That is, since the stand-by current can be supplied in a lump by the stand-by current supply converter 10 that exhibits a high conversion efficiency when the apparatus is operated under light load, it is possible to restrict an occurrence of dark current to the utmost, so that the battery can be prevented from going flat.

According to the first embodiment of the invention, on the provision of the current sensor 13 for detecting a current flowing from the electrical connection box 7 to the respective electronic control units 8a, . . . , 8n, when the ignition switch is turned on, it is carried out to activate the regular-supply converter 9 for power supply. When the ignition switch is turned off and a current value detected by the current sensor 13 is more than the predetermined value, it is carried out to activate the regular-supply converter 9 for power supply. Further, when the ignition switch is turned off and a current value detected by the current sensor 13 is less than the predetermined value, it is carried out to stop the operation of the regular-supply converter 9 and activate the stand-by converter 10 only. In this way, the operations of both converters 9, 10 can be switched on a basis of an actual current value. Note, in the modification, the stand-by current supply converter 10 may be always activated irrespective of the ON/OFF state of the ignition switch and also magnitude of a load current.

In the first embodiment, since the intermediate voltage has a value of 7V somewhat larger than the load voltage (5V), the high voltage is converted to a voltage close to the load voltage by the regular-supply converter 9 exhibiting a high conversion efficiency when the apparatus is operated under high load. Thus, it is possible to reduce the loss of voltage-converting efficiency of the apparatus as a whole and the heat-generation furthermore, improving the fuel consumption. Moreover, since the voltage drop through each series regulator 14 is small (2V=7−5), the heat generation is restricted remarkably, so that it is possible to miniaturize the series regulators 14. Note, although the intermediate voltage may be either 6V or any value from 8V to 11V alternatively, it is necessary to establish a voltage value so as not to cause inconvenience due to the voltage drop at the remote series regulator 14.

Figure 5:
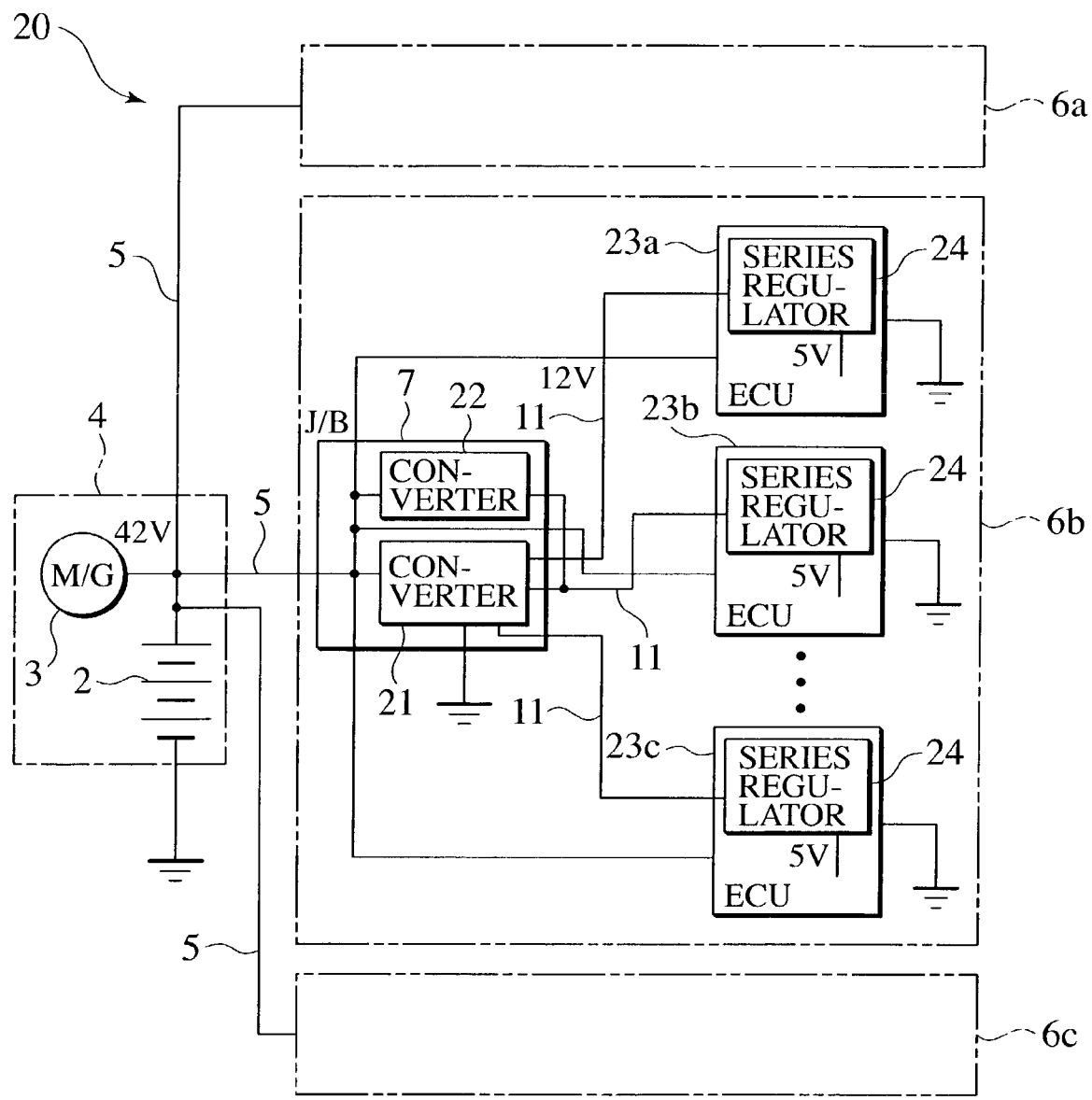
FIG. 5 is a circuit block diagram of the power distributing apparatus in accordance with the second embodiment of the present invention.

FIG. 5 is a circuit block diagram plan view of a power distributing apparatus 20 in accordance with the second embodiment of the invention. As obvious from FIG. 5, the power distributing apparatus 20 of this embodiment differs from the same apparatus 1 of the first embodiment in that a regular-supply converter 21 and a stand-by current supply converter 22 convert a high voltage of 42V to an intermediate voltage of 12V, which is equal to a voltage to drive electronic control units 23a, . . . , 23n, while respective series regulators 24 in the electronic control units 23a, . . . , 23n convert the intermediate voltage of 12V to the load voltage of 5V. Since the other constitutions of this embodiment are similar to those of the first embodiment, their overlapping descriptions are eliminated. Also in FIG. 5, elements identical to those of the first embodiment are indicated with the same reference numerals respectively, for their clearness.

Both effects and operations of the apparatus of this embodiment are similar to those of the first embodiment.

Furthermore, since the intermediate voltage of the second embodiment is established to be equal to drive voltage (12V) for the electronic control units 24 as the downstream-side power distributing parts, it is possible to divert the general-use electronic control units as the downstream-side power distributing parts, whereby the power distributing apparatus 20 can be manufactured at low price.

Again, it will be understood by those skilled in the art that the foregoing descriptions are nothing but one embodiment of the disclosed power distributing apparatus and the modifications. In addition to the above modifications, various changes and modifications may be made to the present invention without departing from the spirit and scope of the invention.

What is claimed is:

1. A power distributing apparatus comprising:
   a power source part for supplying power of a high voltage;
   an upstream-side power distributing part connected with the power source part through a power line thereby to accept power supply of the high voltage from the power source part;
   a plurality of downstream-side power distributing parts connected with the upstream-side power distributing part through power lines thereby to accept power supply from the upstream-side power distributing part and supply power of a load voltage to a plurality of loads;
   a regular-supply converter disposed in the upstream-side power distributing part and also connected to the plurality of downstream-side power distributing parts to convert the high voltage to an intermediate voltage lower than the high voltage and higher than the load voltage, the regular-supply converter capable of converting a voltage with a high conversion efficiency when the power distributing apparatus is operated under high load;
   a stand-by current supply converter disposed in the upstream-side power distributing part and also connected only to one or more of the downstream-side power distributing parts for supplying a stand-by current to convert the high voltage to the intermediate voltage, the stand-by current supply converter capable of converting a voltage with a high conversion efficiency when the power distributing apparatus is operated under light load;
   a plurality of series regulators respectively disposed in the downstream-side power distributing parts to convert the intermediate voltage to the load voltage; and
   further comprising a current sensor for detecting a current flowing from the upstream-side power distributing part to the downstream-side power distributing parts and a controller for controlling the operations of the regular-supply converter and the stand-by current supply converter;
   wherein, under condition that the power distributing apparatus is mounted on a vehicle having an ignition switch, the controller operates so as to activate the regular-supply converter thereby to carry out the power supply when the ignition switch is turned off and a current value detected by the current sensor is more than a predetermined value.

2. The power distributing apparatus as claimed in claim 1, wherein, the controller further operates so as to:
   activate the regular-supply converter thereby to carry out power supply to the downstream-side power distributing parts when the ignition switch is turned on;
   activate the stand-by converter thereby to carry out the power supply when the ignition switch is turned off and a current value detected by the current sensor is less than the predetermined value.

3. The power distributing apparatus as claimed in claim 1, wherein the intermediate voltage is somewhat higher than the load voltage.

4. The power distributing apparatus as claimed in claim 1, wherein the downstream-side power distributing parts are electronic control units.

5. The power distributing apparatus as claimed in claim 4, wherein the intermediate voltage is a voltage of power for driving the electronic control units.

* * * * *